United States Patent [19]

Kucera

[11] Patent Number: 5,121,234
[45] Date of Patent: Jun. 9, 1992

[54] DICHROIC LIQUID CRYSTAL DISPLAY WITH INTEGRAL ELECTROLUMINESCENT BACKLIGHTING

[75] Inventor: Curtis C. Kucera, Phoenix, Ariz.

[73] Assignee: Honeywell Incorporated, Minneapolis, Minn.

[21] Appl. No.: 604,283

[22] Filed: Oct. 29, 1990

[51] Int. Cl.⁵ .................................... G02F 1/1335
[52] U.S. Cl. ........................................ 359/50; 359/48; 359/62
[58] Field of Search ................ 350/334, 345; 359/48, 359/50, 62

[56] References Cited

U.S. PATENT DOCUMENTS

| 4,500,173 | 2/1985 | Leibowitz et al. | 350/345 |
| 4,580,877 | 4/1986 | Washo | 350/345 |
| 4,772,885 | 9/1988 | Uehara et al. | 359/50 |
| 4,924,215 | 5/1990 | Nelson | 350/334 |

FOREIGN PATENT DOCUMENTS

| 0221828 | 12/1983 | Japan | 350/345 |
| 0037530 | 3/1984 | Japan | 350/334 |

OTHER PUBLICATIONS

Dickerson et al., "Transmissive-Reflective Liquid Crystal Display," IBM Technical Disclosure Bulletin, vol. 27, No. 7A, pp. 3911-3912, Dec. 1984.
Hornberger, "Liquid Crystal Display," IBM Technical Disclosure Bulletin, vol. 12, No. 10, pp. 1697-1698, Mar. 1970.

Primary Examiner—Stanley D. Miller
Assistant Examiner—Anita Pellman Gross
Attorney, Agent, or Firm—Arnold L. Albin; Dale E. Jepsen

[57] ABSTRACT

A composite liquid crystal electroluminescent electro-optical display device utilizing single-cell construction. Backlighting is furnished by a low-intensity, low-power-consumption integrally formed electroluminescent light source cooperating with a liquid crystal element with commonly excited electrodes. The integral electro-luminescent light source replaces the requirement for a transflector. The invention offers substantially improved contrast while minimizing physical size, power dissipation and construction complexity.

13 Claims, 4 Drawing Sheets

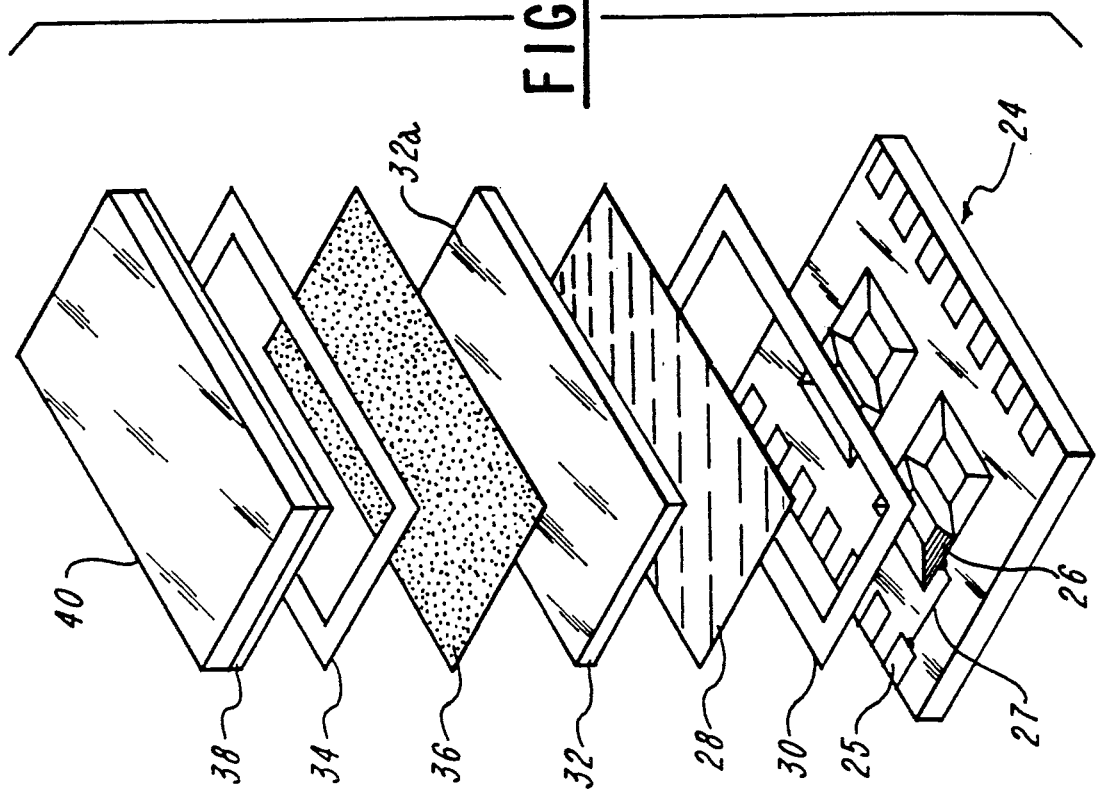
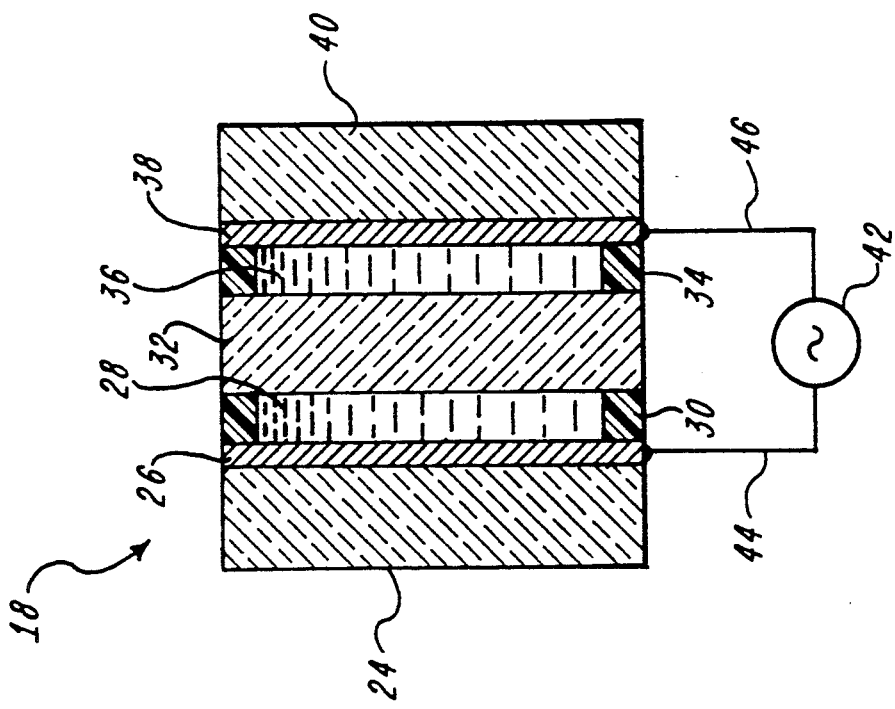

DICHROIC LIQUID CRYSTAL DISPLAY WITH INTEGRAL ELECTROLUMINESCENT BACKLIGHTING

BACKGROUND OF THE INVENTION

1. Field of the Invention

The invention relates generally to improved electro-optical display devices, and, more particularly, to a display apparatus utilizing a dichroic liquid crystal nematic medium and an electroluminescent backlight to provide enhanced brightness and contrast.

2. Description of the Prior Art

Display devices employing electro-optical materials such as nematic liquid crystal media are well known in the art. Liquid crystal materials are characterized by large changes in optical index of refraction for only modest changes in the electric field at relatively low electric field magnitudes and have other significant advantages, as are widely discussed in the literature. Liquid crystal electro-optic effects are important because they do not require the emission of light; instead, they modify the passage of light through the liquid crystal, either by light scattering, modulation of optical density, or color changes. Further, they provide enhanced readability under high-brightness ambient conditions.

Liquid crystal displays are particularly adapted for use in equipment requiring alphabetical, numeric, or static displays such as used in commercial and military flight deck avionics equipment.

Dichroic liquid crystal displays (LCD) provide excellent reflective (day-time) contrast and readability and obviate the need for polarizing elements. However, under backlighted (night-time) conditions, contrast and readability in this type of display is very poor. Contrast for dichroic liquid crystal displays may be as high as 15:1 for reflective conditions and as low as 5:1 for backlighted conditions. FIG. 1 shows a typical structure of the prior art for providing improved backlighted contrast in dichroic liquid crystal displays. A dual-cell display comprises two superposed substantially identical displays, a front display 10 and a rear display 14. The two displays are energized character for character in parallel. A light source 16, which may be comprised of an array of incandescent bulbs, is utilized as a source of backlighting wherein the backlighting is first passed through the rear display cell 14 and then directed through the front cell 10. This allows the cooperating energized characters of the two cells to transmit a high percentage of the back-lighting, thereby maintaining a bright character. Further, the combined background areas of the superposed cells provides a surface that is nearly opaque and thereby blocks a high percentage of the transmitted backlight. The result is a display which will produce a typical backlighted contrast of 15:1.

Disadvantageously, the dual-cell displays require two independent LCD cells to enhance the contrast. This essentially doubles the complexity of the display, by requiring twice as many cells, functional character segments, and electrical interconnections. The dual-cell display is made further complex by the requirement for precision alignment in an optical sense.

In order to provide satisfactory day-time viewing, the prior art further requires a transflector to provide a reflective surface between the two cells, the reflective surface thereby enhancing readability by reflecting ambient light. This transflector, while it is a good reflector, will typically transmit only ten percent of the available light. Because the backlighting of the dual-cell display must illuminate two independent LCD cells as well as the transflector, the required backlighting must be a very high intensity source. Such a high-intensity backlighting source is physically very large and typically dissipates eighty percent of the total power applied to the display module.

The present invention utilizes a single-cell LCD display, in which the high intensity backlight is replaced by an integral low intensity, low power electroluminescent light source. The integral electroluminescent light source effectively obviates the need for a transflector. Eliminating the requirement for a transflector significantly reduces the total backlighting requirement of the display. The structure of the present invention provides increased backlighted contrast of the display and reduction in physical size, power dissipation, and complexity of the display module.

SUMMARY OF THE INVENTION

The invention comprises a novel improved liquid crystal electro-optical display device for control of light transmission. The structure comprises an electro-optical cell having first and second dielectric plates with a liquid crystal fluid disposed therebetween, each of the first and second plates being optically transmissive, and deposited upon a first one of the dielectric plates are portions of optically transmissive electrically conductive material on a surface facing the liquid crystal fluid.

The structure further comprises an electro-luminescent film disposed upon a second one of the dielectric plates and on a surface distal to the liquid crystal layer.

A third dielectric plate having first and second planar surfaces and an optically reflective conductive electrode superimposed upon one of the planar surfaces thereof is disposed upon the electroluminescent film.

The liquid crystal fluid and the electro-luminescent film are responsive to a source of electric power for producing an electric field and cooperate such that selective energization of the portions of electrically conductive material causes corresponding energization of portions of the electroluminescent film superimposed upon the energized portions of electrically conductive material, and further causes selective energization of corresponding areas of the liquid crystal fluid to a mode of light transmissibility, so that the energized transmissive areas of the liquid crystal fluid transmit light emitted from the energized portions of the electroluminescent film, while deenergized portions of the electroluminescent film do not emit light, thus combining with the deenergized portions of the liquid crystal fluid to enhance contrast of the display.

In a preferred embodiment, the liquid crystal fluid comprises a nematic-phase material which exhibits a substantial realignment of the molecular order thereof in the presence of an electric field and wherein the liquid crystal fluid comprises dichroic light modification properties.

BRIEF DESCRIPTION OF THE DRAWINGS

FIG. 3 is a view in cross-section, useful in explaining the operation of the invention.

FIG. 4 is an exploded view of the first embodiment of the invention as shown in FIG. 2.

DESCRIPTION OF THE PREFERRED EMBODIMENTS

Figure 1:
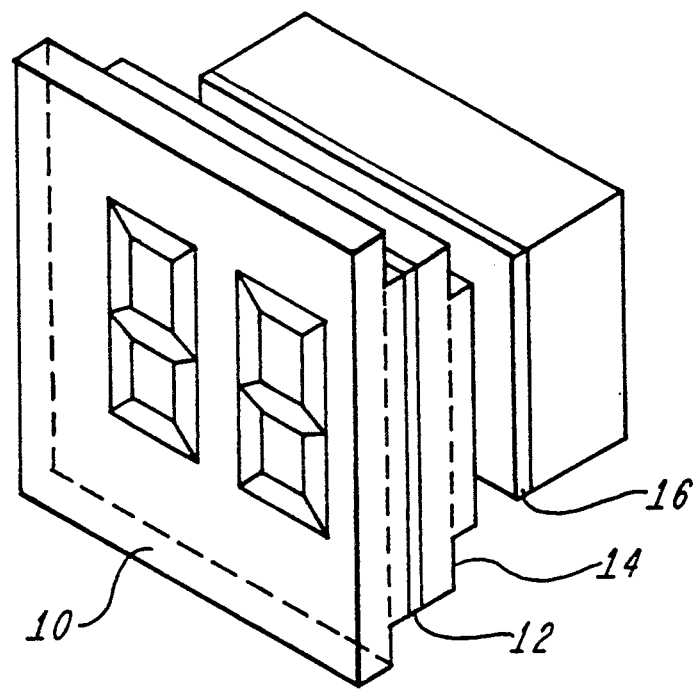
FIG. 1 is a perspective view of a prior art dualcell LCD backlighted display.
Figure 2:
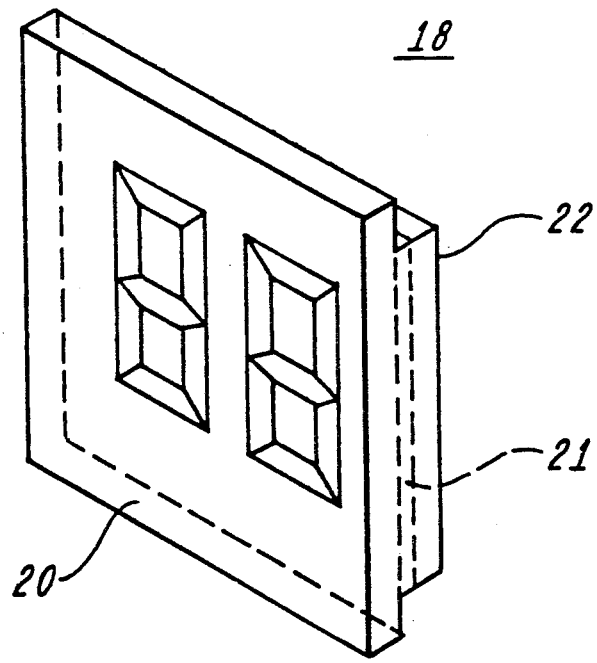
FIG. 2 is a perspective view of a first embodiment of the invention.

FIGS. 2 through 4 illustrate one preferred form of the invention in which a first method of construction is utilized. The structure, when completed, is formed of components particularly seen in FIG. 2 as an integrated LCD cell 18 comprised of a layered configuration including a conventional LCD cell 20, an electroluminescent layer 21, and a backplane 22. The embodiment of FIG. 2 is shown in more detail in the cross-section view of FIG. 3 as a layered configuration including a first dielectric plate 24, which may be comprised of soda-lime glass so that it is optically transmissive, a second dielectric plate 32, also comprised of soda-lime glass, and a field-effect liquid crystal layer 28. Optically transparent conducting electrodes 26 are disposed upon a planar surface of dielectric plate 24 for coupling voltages from a power source 42 through lead 44 to liquid crystal layer 28. The conductive layer 26 is preferably comprised of discrete conductive elements which, when energized by the power source 42, generate an electric field across the thin liquid crystal material layer. The electrodes may be diamond-shaped or oval or may take other forms. To complete the enclosure for the liquid crystal material, a thin rectangular gasket or wall 30, for example, of a commercially available solid polymerized fluorocarbon resin, is used to join, in hermetically sealed relation, the peripheries of dielectric plates 24 and 32, in a manner well known to those skilled in the art. Each electrode 26 is supplied as it is put in place with a respective conductor (not shown) for coupling voltages from power source 42 through lead 44, which may represent a plurality of digital excitation sources for exciting individual elements of the transparent conductor layer 26.

In a similar manner, a third dielectric plate 40 has deposited thereupon an optically reflective conductive electrode 38 superimposed over the planar surface of plate 40 which is energized by lead 46 from power source 42. A layer of electroluminescent material 36, such as luminescent phosphor pigment, which may be comprised of an intrinsic phosphor (responsive to alternating currents) suitable for thin film or thick film construction, such as made by Luminescent Systems Inc., Etna Road, Lebanon, N.H. 03766, is deposited upon or may be dispersed within the dielectric plate 32 and hermetically sealed by a resin gasket 34, in the manner heretofore described with respect to gasket 30. Electrodes 26 and 38 form the plates of a capacitor which, when energized by power source 42, will selectively cause the illumination of the electroluminescent layer 36 in a manner to be described.

In FIG. 4 of the appended drawings, there is shown an exploded perspective view of the construction of the preferred embodiment of the invention. The structure, when completed, is formed of a layered configuration including an optically transmissive insulating substrate 24, electrically conducting transparent electrodes 26, and contacts 25, interconnected to respective electrodes 26 by deposited conductors 27. A plurality of conductors 26 are disposed on substrate 24 to form alphabetical or numerical digits in a conventional manner. While each conductor 26 is coupled to a discrete contact 25, for simplicity of illustration only a typical set of contacts, and interconnecting electrodes is shown. In the preferred embodiment of the invention, the electrodes 26 are thin, relatively transparent layers of a conductive metal nondestructive of the liquid crystal composition and may be formed in a conventional manner of tin oxide, indium oxide, or indium-tin oxide, by evaporative deposition or sputtering in a vacuum, in a well-known manner. The technology for vacuum sputtering onto glass at relatively low temperatures avoids warping of the flat glass and is well known. It may be taken as well known how to supply electrical potential to, and thus activate, patches of electroconductive transparent oxide coating situated on pieces of flat glass.

A seal or gasket 30, which may be comprised of an epoxy resin, may be applied by silk screening to substrate 24 on the proximate surface. A second optically transmissive substrate 32 is overlaid on seal 30. The liquid crystal composition 28 is injected into the volume between substrates 24 and 32 and the epoxy then cured in a conventional manner so as to hold the structure together and to encapsulate the liquid crystal composition. A film of electroluminescent material 36, such as has been previously described, is then deposited upon a planar surface 32A of substrate 32 distal to substrate 24, by a conventional process, such as silk screening. A second seal or gasket 34, also comprised of epoxy resin, is then formed on the deposited electroluminescent layer 36. Completing the enclosure is a third substrate 40, which has deposited thereupon on a planar surface 38 proximal to the electroluminescent coating 36 a thin film optically reflective conductive layer 38. Film 38 is superimposed over substantially the entire active area of electroluminescent layer 36 and is provided with a contact (not shown) for completing the electrical excitation circuit. Gasket 34 is cured in a conventional manner so as to seal electroluminescent layer 36 between substrates 32 and 40.

The substrates 24, 32, and 40 are typically of the order of 0.010 to 0.020 inches thick. The liquid crystal material is typically a thin layer of the order of 4 microns in thickness. The electroluminescent material is typically 0.001 to 0.005 inch thick. The metallized electroconductive coatings may be quite thin and highly resistive, for example, on the order of 150 ohms per unit square or above, and possibly as high as 5,000 or 10,000 ohms per unit square.

In operation, the present invention utilizes the similar functional characteristics of liquid crystal and electroluminescent materials. Both materials are activated when exposed to an electrical potential in the form of an alternating current in a parallel plate capacitor configuration. Both materials operate within a voltage potential range of 20 to 400 volts RMS. The operating range of the electrically active materials is within a driving frequency range of 30 to 500 Hz.

Figure 5:
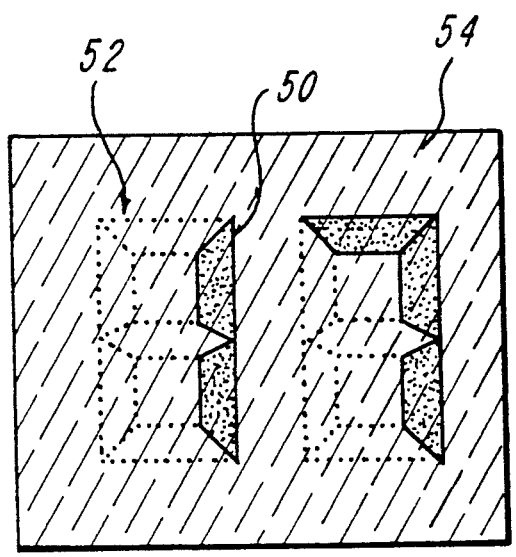
FIG. 5 is a plan view of the face of a prior art LCD device.
Figure 6:
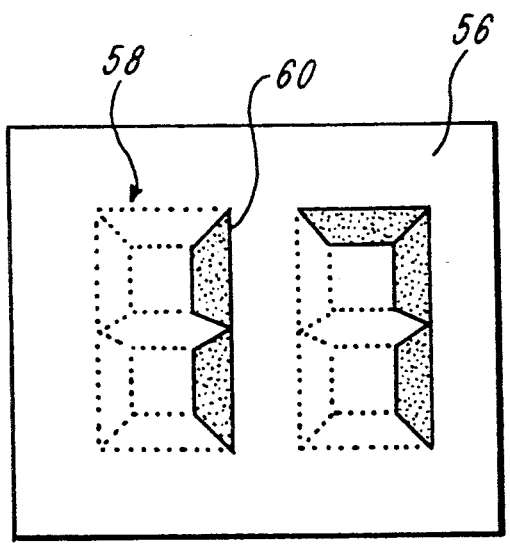
FIG. 6 is a plan view of the face of the present invention, useful in explaining the operation of the invention.

The electroconductive oxide elements 26 and 38 form the parallel plates of a capacitive circuit. When energized by a signal source having a voltage and frequency within the above-specified ranges, the liquid crystal fluid medium exhibits a substantially electricfield induced realignment of the molecular order thereof so as to allow light to be transmitted through the energized section. Because the same capacitive circuit provides excitation for the electroluminescent material, the electroluminescent layer will emit light from that exact location underlying the excited liquid crystal section. This will form an illuminated segment of the character which is desired and which will appear lighted on a dark background. This is shown most clearly in FIG. 6, where the background area 56 is not energized, while a segment 60 has been energized and is therefore displayed. Segment 58 which has not been energized, is indistinguishable from the background 56. Because the electroluminescent material is only energized at the location of the activated liquid crystal composition, the remaining area 56 of the display does not emit any light. It is this property that provides the very high contrast capability of the present invention. In comparison, the prior art display, shown in FIG. 5, provides background illumination over the entire display surface 54, denoted by the dashed lines thereupon. Thus, the background illumination transmits light through the energized segments 50 and the nonenergized segments 52, as well as the background 54. Because a high percentage of the backlight is transmitted through the background, the contrast of the display is inherently degraded.

The present improvement does not require an active light source and therefore background 56 and nonenergized segments 58 do not emit any light. In theory, this is capable of producing infinite contrast for the display. However, in practice, it may be assumed that up to one percent of the available light will be diffused and reflected internally within the display, providing some light emission through the background 56 and the nonenergized segments 58.

Lighting requirements for a display as used in avionics equipment typically require a light output of the order of 3.0 foot-lamberts (ftl). In a typical dual-cell display utilizing backlighting, the transmission efficiency is such that approximately 55-foot candles of backlighting are required to produce 3.0 foot-lamberts output intensity. By comparison, the backlighting requirements for the present invention are of the order of 3.5-foot candles to produce 3.0 ftl output, which is an improvement of the order of 15 times in optical efficiency. Further, the required lighting intensity relates directly to the power dissipation of the displays. In the prior art, the high intensity backlighting required a typical power dissipation of 1.125 watts for a 1.0"×0.5" display comprising three characters. In comparison, the power dissipation for a display of the same size constructed in a manner of the present invention would be 0.035 watts. This corresponds to a reduction in total backlighting power of over 96 percent. A further advantage of the present invention is that due to th characteristics of the display, contrast is significantly increased as compared to the prior art. Thus, a prior art dual-cell liquid crystal display producing an output of 3 ftl has a residual background illumination of 0.165 ftl. This results in a typical, best-case contrast for the prior art of 17:1. In the present invention, an output of 3 ftl results in a residual background illumination of only 0.007 ftl, and provides a contrast ratio in excess of 400:1.

Figure 7:
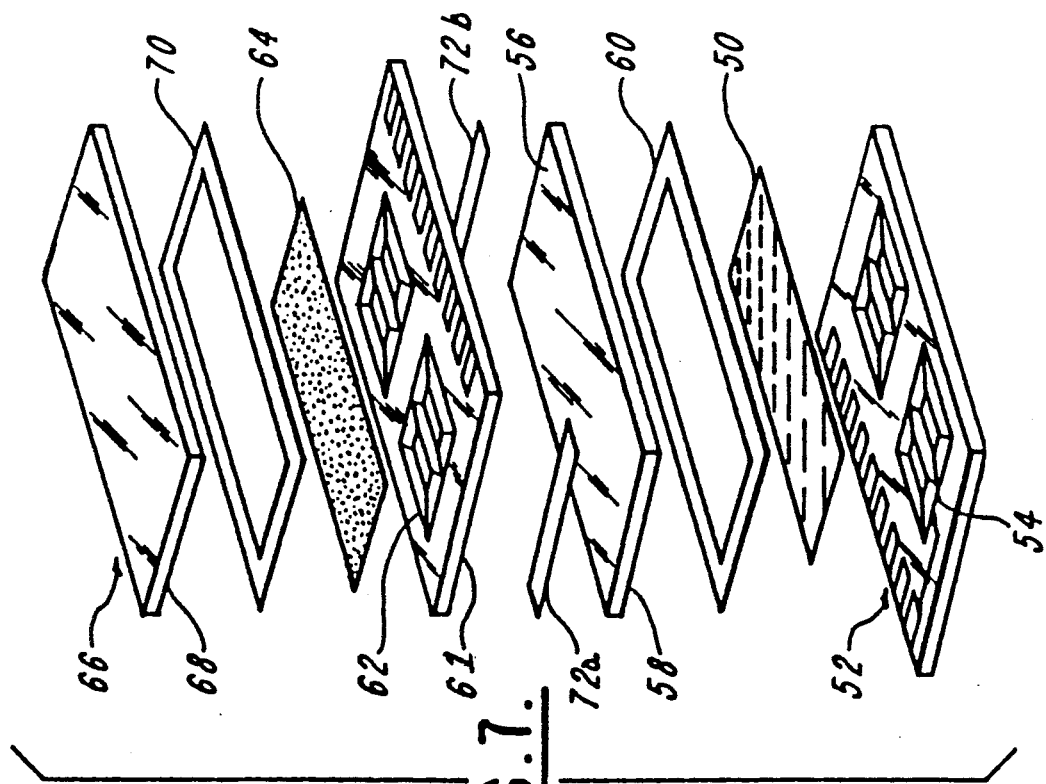
FIG. 7 is an exploded view of a second embodiment of the invention, employing independent energization of the liquid crystal element and electroluminescent layer and independent liquid crystal and electroluminescent cells.

FIG. 7 shows an exploded view of an alternate embodiment of the invention, wherein the electro-optical and electroluminescent cells are independently fabricated to ease construction, and then superimposed to provide a common display when excited by a common power source. While materials for the liquid crystal and electroluminescent layers will preferably be selected for operability with a common alternating current excitation, the cells may be independently energized, if desired, so long as corresponding electrically conductive segments are commonly excited.

A liquid crystal layer 50 is deposited between a first dielectric plate 52 and a second dielectric plate 56. Deposited on a surface of plate 56 and facing the liquid crystal layer 50 is a transparent conductive oxide coating 58 to form an electrically conductive and optically transmissive backplane for the liquid crystal cell. Gasket 60 provides an edge seal to hermetically seal the liquid crystal cell. A plurality of electrodes 54 formed of transparent conductive oxide are deposited on the proximal surface of plate 52.

An electroluminescent cell is formed by a further dielectric plate 6 also provided with conductive electrodes 62. A layer of electroluminescent material 64 is deposited upon the proximal surface of plate 60. A backplate comprised of dielectric plate 66 and reflective conductive oxide layer 68 is applied to electroluminescent layer 64 and edge sealed by gasket 70.

The electro-optical cell and the electro-luminescent cell thus formed are superimposed to align the segmented electrodes forming alphanumeric characters or other symbology and permanently cemented by epoxy resin strips 72a and 72b.

Figure 8:
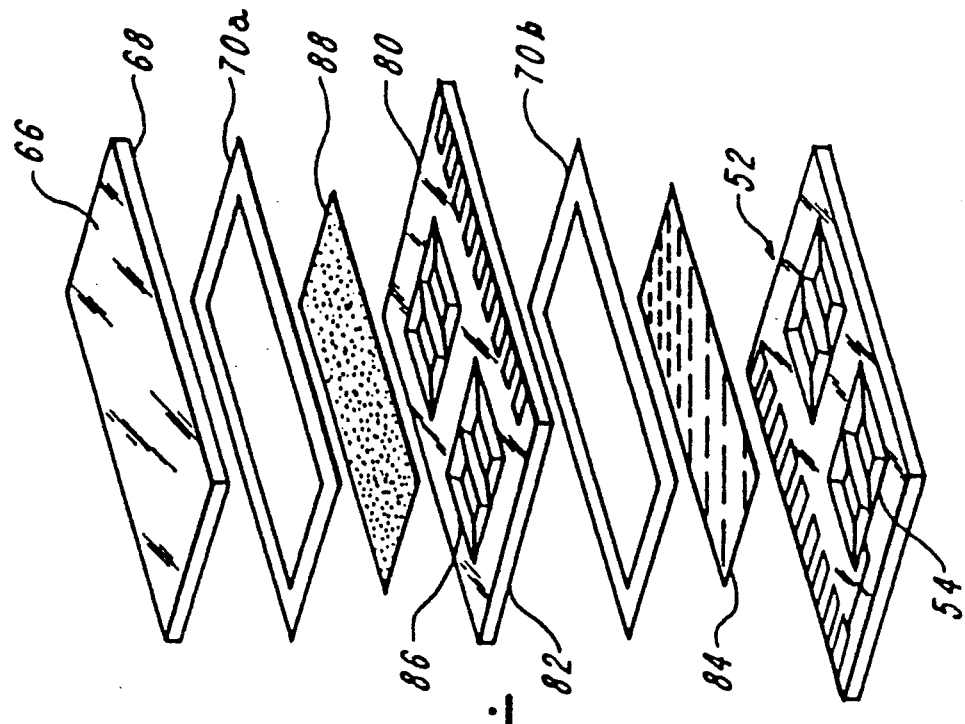
FIG. 8 is an exploded view of a further embodiment of the invention utilizing a common cell element while independently energizing independent liquid crystal and electroluminescent cells.

A still further embodiment is shown in FIG. 8, wherein the electro-optical cell and electroluminescent cell enjoy a common interface element which comprises a dielectric plate 80 having an electrically conductive optically transparent oxide coating 82 on its proximal surface with respect to liquid crystal layer 84 and segmented oxide electrodes 86 on its distal surface, on which is disposed the electroluminescent layer 88. The use of the common dielectric plate reduces optical transmission losses as compared to the configuration of FIG. 7, but is more difficult to construct.

The elements comprising the dielectric plates 52 and 66, conductive coatings 54 and 68, and gaskets 70a and 70b are as previously described with respect to corresponding elements of FIG. 7.

Thus, it is seen that the present invention preferably utilizes a single-cell type display construction. The usual high-intensity backlight is replaced by a low-intensity, low-power integral electroluminescent light source. The integral electroluminescent light source effectively replaces the requirement for a transflector in the prior art liquid crystal display. Utilizing single-cell type construction, the total complexity of the liquid crystal display is essentially reduced by one half when compared to prior art. Eliminating the requirement for a transflector significantly reduces the total backlight requirements of the display. The backlighted contrast of the display is greatly increased, and the physical size and power dissipation of the display module are reduced for a given output light intensity.

While the invention has bee described in its preferred embodiments, it is to be understood that the words which have been used are words of description rather than of limitation and that changes within the purview of the appended claims may be made without departing from the true scope and spirit of the invention in its broader aspects.

Embodiments of an invention in which an exclusive property or right is claimed are defined as follows:

1. An electro-optical display device for control of light transmission, comprising:

electro-optical cell means including liquid crystal fluid means disposed between first and second dielectric plate means, each of said first and second plate means being optically transmissive, and said first one of said plate means having electrically conductive optically transmissive portions at a surface facing said liquid crystal means, electroluminescent film means disposed on said second one of said plate means and distal to said electrically conductive portions, third dielectric plate means having first and second planar surfaces and comprising conductive optically reflective electrode means superimposed upon one of said planar surfaces proximal to said electroluminescent film means, said liquid crystal fluid means and said electroluminescent film means being responsive to a source of electric power for producing an electric field, and cooperating such that selective energization of said electrically conductive portions of said one of said plate means causes corresponding selective energization of portions of said electroluminescent film means superimposed on said energized electrically conductive portions of said one of said plate means, and further causes selective energization of corresponding areas of said liquid crystal fluid means to a mode of light transmissibility, so that said energized transmissive areas of said liquid crystal fluid means transmit light emitted from said energized portions of electro-luminescent film means, while the deenergized portions of said electroluminescent film means do not emit light, thereby combining with said deenergized portions of said liquid crystal film means to provide enhanced contrast of said electro-optical display device.

2. An electro-optical display device as set forth in claim 1 wherein said liquid crystal fluid means comprises a nematic-phase material exhibiting substantially electric-field-induced realignment of the molecular order thereof.

3. An electro-optical device as set forth in claim 2, wherein said liquid crystal fluid means comprises dichroic light modification properties.

4. An electro-optical display device as set forth in claim 3 further comprising first seal means for completing liquid crystal enclosure means defined in part by said first and second dielectric plate means.

5. An electro-optical display device as set forth in claim 4 further comprising second seal means for completing an enclosure of said electroluminescent means in part defined by said conductive electrode means and said electroluminescent film means.

6. An electro-optical display device as set forth in claim 5, wherein at least one of said first, second, and third dielectric plate means is comprised of glass.

7. An electro-optical display device as set forth in claim 6, wherein said electrically conductive portion of said one of said plate means and said conductive electrode means are comprised of the group consisting of electrically conductive metallic oxides.

8. An electro-optical display device as set forth in claim 7, wherein said electrically conductive portions of said one of said plate means are comprised of indium-tin oxide.

9. An electro-optical display device as set forth in claim 8, wherein said electroluminescent film means is comprised of a luminescent phosphor pigment of the intrinsic type.

10. An electro-optical display device for control of light transmission, comprising:

electro-optical cell means including liquid crystal fluid means responsive to a source of electrical excitation for forming alphanumeric characters, and electroluminescent cell means superposed on said electro-optical cell means, portions thereof selectively responsive to said source of electrical excitation, said electro-optical cell means and said electroluminescent cell means provided with electrodes cooperating when activated by said source of electrical excitation to form a common alphanumerical character characterized by light emissions from said electroluminescent cell means in regions preferentially electrically excited and by the absence of light emissions from regions which have not been electrically excited.

11. An electro-optical display device for control of light transmission, comprising:

electro-optical cell means including liquid crystal fluid means disposed between first and second dielectric plate means, each of said first and second dielectric plate means being optically transmissive, and said first dielectric plate means having electrically conductive optically transmissive discrete portions at a surface facing said liquid crystal means, electroluminescent cell means superposed on said electro-optical cell means and including third dielectric plate means having first and second planar surfaces and comprising optically transmissive discrete electrically conductive electrode means superimposed upon one of said planar surfaces distal to said electro-optical cell means, said discrete electrode portions of said electroluminescent cell means being aligned with corresponding portions of said electro-optical cell means, said electroluminescent cell means further comprising electroluminescent film means disposed on said third dielectric plate means and on said distally superimposed electrically conductive electrode means, and fourth dielectric plate means comprising an optically reflective electrically conductive electrode means superposed on said film means, said electro-optical cell means and said electroluminescent film means being responsive to a source of electric power for producing an electric field, and cooperating such that selective energization of corresponding electrically conductive portions of said one of said first and third dielectric plate means causes corresponding energization of portions of said electroluminescent film means superimposed thereon, and further causes selective energization of corresponding areas of said liquid crystal fluid means to a mode of light transmissibility, so that said energized transmissive areas of said liquid crystal fluid means transmit light emitted from said energized portions of electro-luminescent film means, while the deenergized portions of said electroluminescent film means do not emit light, thereby combining with said deenergized portions of said liquid crystal film means to provide enhanced contrast of said electro-optical display device.

12. An electro-optical display device for control of light transmission, comprising:

electro-optical cell means including liquid crystal fluid means disposed between first and second dielectric plate means, each of said first and second dielectric plate means being optically transmissive, and each of said dielectric plate means having corresponding electrically conductive optically transmissive discrete portions, one plurality of said discrete portions being disposed on said first dielectric plate means at a surface facing said liquid crystal means, and a corresponding plurality of said discrete portions being disposed on said second dielectric plate means at a surface opposing said liquid crystal means, electroluminescent film means superposed on said second dielectric plate means on said opposing surface, and third dielectric plate means comprising optically reflective electrically conductive electrode means superposed on said film means, said electro-optical cell means and said electroluminescent film means being responsive to a source of electric power for producing an electric field, and cooperating such that selective energization of said electrically conductive portions of dielectric plate means causes corresponding energization of portions of said electroluminescent film means superimposed thereon, and further causes selective energization of corresponding areas of said liquid crystal fluid means to a mode of light transmissibility, so that said energized transmissive areas of said liquid crystal fluid means transmit light emitted from said energized portions of electroluminescent film means, while the deenergized portions of said electroluminescent film means do not emit light, thereby combining with said deenergized portions of said liquid crystal film means to provide enhanced contrast of said electro-optical display device.

13. A method for enhancing light transmission in an electro-optical display device, comprising the steps of:

providing an electro-optical cell having a pair of spaced plates, each of said pair being transparent to light, dichroic nematic liquid crystal means disposed between said plates, a first one of said plates having a plurality of electrically conductive means for selectively enabling an electrical field to be applied across said liquid crystal means, such that the molecules of said liquid crystal means are preferentially aligned to permit light transmission through predetermined portions of said plates, providing an electroluminescent cell cooperating with said electro-optical cell and said electrical field, said electroluminescent cell having a layer of electroluminescent material disposed to illuminate said electro-optical cell in alignment with said predetermined portions of said plates, and a layer of reflective, electrically conductive material opposing said electroluminescent layer, for enabling said electrical field to be applied to said electro-optical cell and to said electroluminescent layer, and for reflecting incident light to return through said electro-optical cell, and providing to at least a portion of said electrically conductive means and said layer of conductive material an electric field across at least a portion of said liquid crystal means, for changing the orientation of said liquid crystal molecules comprising said liquid crystal means, such that light from said electroluminescent layer is selectively transmitted through a region of said liquid crystal means wherein said molecules have been reoriented and substantially no light is transmitted through regions which have not been molecularly reoriented.

* * * * *